INVENTOR.
BENJAMIN KAZAN
BY Ronald Zibelli
ATTORNEY

United States Patent Office 3,440,428
Patented Apr. 22, 1969

3,440,428
IMAGE CONVERTER USING CHARGED
PHOTOEMISSIVE LAYER
Benjamin Kazan, Pasadena, Calif., assignor to Xerox
Corporation, Rochester, N.Y., a corporation of
New York
Filed Sept. 29, 1966, Ser. No. 582,859
Int. Cl. H01j 31/50
U.S. Cl. 250—213　　　　　　　　　　　　　　8 Claims In general, the present invention relates to image intensifiers and to image storage tubes. More specifically, the present invention relates to a field effect storage image converter.

Considerable difficulty is experienced in the use of the prior art devices. They have been found generally to be complex, bulky and to require electron optics and imaging from one surface to another. In general, the prior art devices can be employed either as a recorder or as a receiver but not as both simultaneously. Some prior art devices are able to integrate low-level optical images and generate a corresponding optical output; and may alternatively be used for capturing and storing a transient periods.
image which can then be viewed for relatively long The prior art has been able to achieve the above image storage and display functions only through the use of relatively complex, bulky tubes such as shown in FIG. 1 which employs a relatively fragile self-supported storage mesh 4. In such tubes photoelectrons from the photocathode 6 are electron-optically imaged onto the storage mesh 4 which consists of a metal mesh 8 coated on one side with insulator 10. A charge pattern stored on this insulator is then used to control the flow of flooding electrons from the photocathode so that a pattern of current emerges through the mesh holes 12. The flooding electrons are produced by flooding the photocathode with an auxiliary light (not shown). This pattern is, in turn, electron-optically imaged onto the phosphor screen 14 where it produces a suitable visible image. It should be noted that in addition to the glass tube structure 16 itself with collector mesh 18, an external magnetic focusing coil 20 and other elaborate control circuitry 21–32 is employed for the electron imaging.

The use of an image tube in a particular system may be precluded or curtailed because of the above noted deficiencies.

Accordingly, it is an object of this invention to provide a new, highly efficient image tube which overcomes the deficiencies of the prior art as described above.

It is, also, an object of the present invention to provide a new, highly efficient method of image intensification.

It is an object of this invention to provide a simpler structure capable of simultaneous recording and viewing.

A further object of this invention is to enable the integration of low-level optical images or capturing of a transient image, followed by the generation of a corresponding optical output from the stored input.

Another object of the present invention is the provision of a compact, rugged image device, not requiring critical electron-optical imaging or focusing adjustments.

Further, it is an object of this invention to provide a device capable of longer storage times which will allow viewing of a distortion free image during image integration.

Other objects and a fuller understanding of the invention may be had by referring to the following description and claims, taken in conjunction with the accompanying drawings.

The present invention overcomes the deficiencies of the prior art and achieves its objectives by utilizing the charging of a photoemissive mosaic in response to an optical input. The charge mosaic by its field effect on a field-effect semiconductor produces increases in the local conductivity of the semiconductor. As a result of the pattern of conductivity increases in the semiconductor a corresponding current flow takes place in an electroluminescent phosphor layer causing it to emit light corresponding to the input image. This process is achieved by use of a glass plate which supports a set of interdigital transparent electrodes and is coated successively with an electroluminescent phosphor layer, a field-effect semiconductor layer, and an insulating layer covered with a mosaic of photoemitting elements to integrate and store an optical input for simultaneous or later viewing as desired.

In order to facilitate understanding of the present invention, reference will now be made to the appended drawings of a preferred embodiment of the present invention. The drawings should not be construed as limiting the invention, but are exemplary only. In the drawings.

Figure 1:
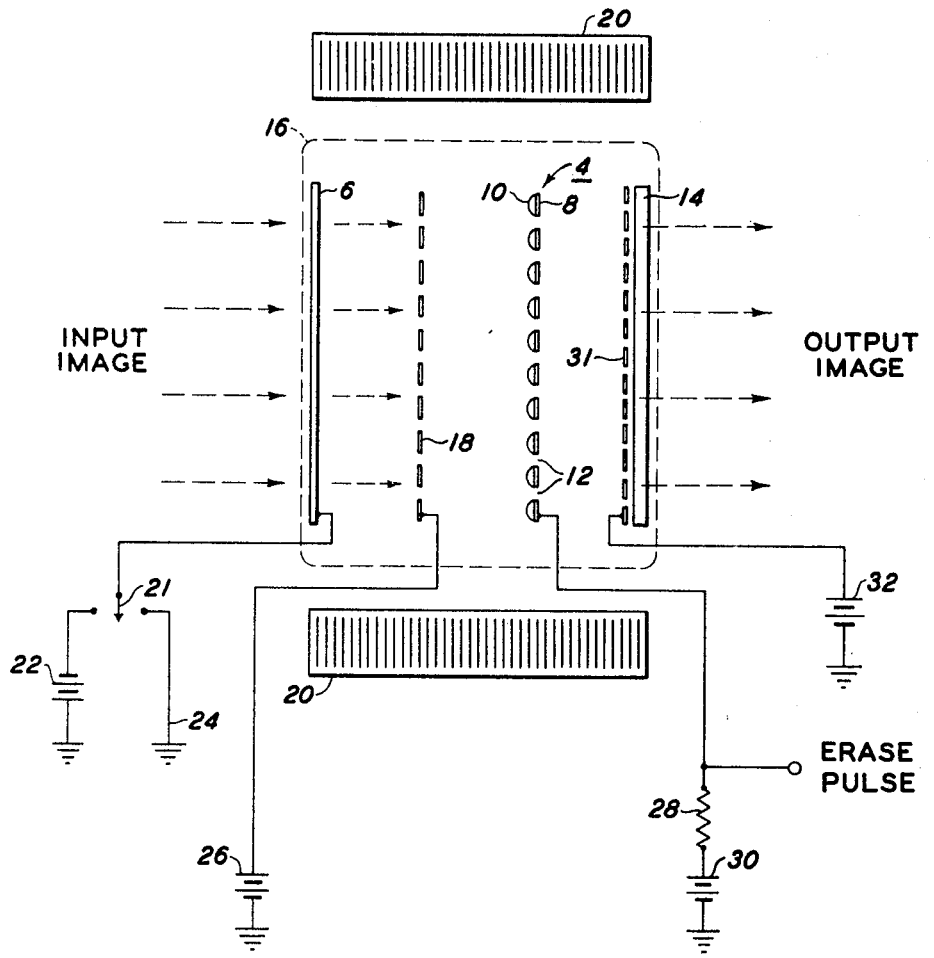
FIGURE 1 is a cross section of a typical prior art device.
Figure 2:
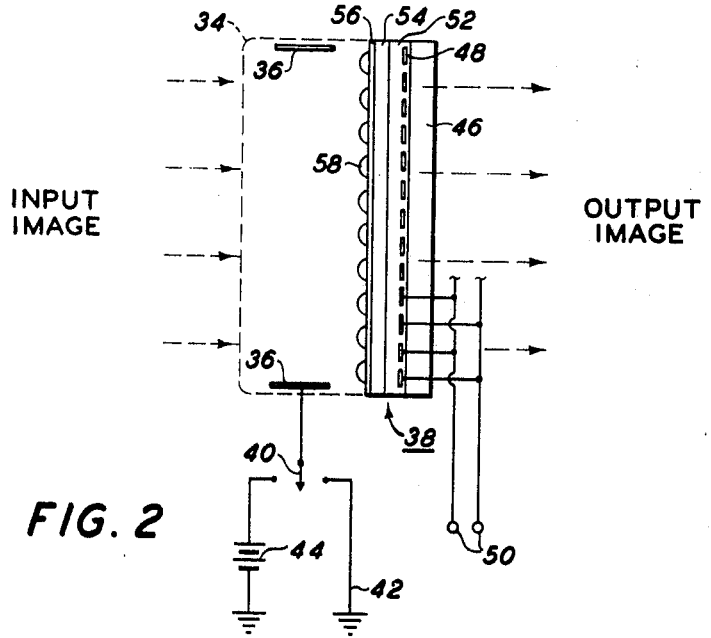
FIGURE 2 is a cross section of the preferred embodiment of the present invention.

The general arrangement of an image device corresponding to the present invention is shown in cross section in FIG. 2. A glass envelope 34 surrounds a collector cylinder 36 and a layered structure 38. The collector cylinder 36 is electrically connected through the envelope 34 to a store-erase switch which provides for a connection to ground 42 in the erase position and to a grounded power source 44 on the order of, for example, 100 volts. All of the active layers of the present invention are in contact in a single flat layer structure 38. Layered structure 38 comprises a supporting glass plate 46 whose surface is provided with a set of interdigital conducting transparent electrode strips 48 which are connected through the glass plate 46 to a source of alternating current voltage 50. The glass plate 46 and the interdigital electrodes 48 are coated with an electroluminescent phosphor 52. Any electroluminescent phosphor may be utilized. Typical electroluminescent phosphors are zinc sulfide, zinc orthosilicate with traces of manganese, other oxides and sulfides of zinc, cadmium, and magnesium, and also zinc sulfide with mixtures of copper and/or lead. The electroluminescent phosphor layer 52 is coated with a field effect semiconductor layer 54. Any field-effect semiconductor may be used in layer 54. Typical field effect semiconductors include zinc oxide, cadmium sulfide, antimony trisulfide, cadmium oxide, lead oxide, germanium, and silicon. The field-effect semiconductor layer 54 is coated with a thin layer of an electrically insulating material to provide an insulator layer 56. An electrical insulator through which light or electromagnetic radiation may pass when it is in a thin film form is suitable for the insualtor layer 56. Typical electrical insulators are silicon monoxide, silicon dioxide, calcium fluoride and aluminum oxide. The outer surface of the insulator layer 56 is provided with a mosaic of photoemitting elements, 58 such as are used in the iconoscope television pickup tube. Typical photoemitting materials are animony-cesium compounds and mixtures of antimony-cesium, silver-oxygen-cesium, and bismuth-oxygen-silver-cesium.

The collector cylinder 36 is also coated with a suitable photoemissive material for reasons hereafter discussed.

Figure 3:
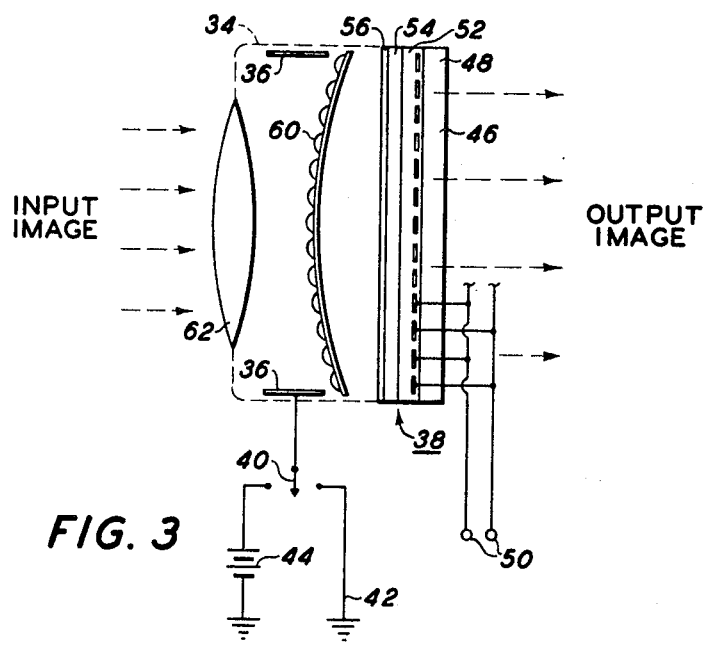
FIGURE 3 is a cross section of an alternative embodiment of the present invention.

An alternative structure is shown in FIGURE 3. This structure is similar to that shown in FIGURE 2 with like reference numerals indicating the same elements of structure. The structure of this alternative differs from that of the preferred embodiment by providing an independent photoemissive mosaic layer 60 separated from the other layers described above. Suitable optics indicated by lens 62 provides an image on the photoemissive mosaic layer which is transmitted to the field effect semiconductor layer 54 through insulator 56.

In operation an alternating current voltage 50 is maintained across the interdigital electrode strips 48. Initially, the photoemissive mosaic elements 58 are at ground potential. In this condition, the conductivity of the field effect semiconductor layer 54 composed of, for example, zinc oxide or cadmium sulfide is low so that essentially no alternating currents flow through the electroluminescent phosphor layer 52. Thus, the electroluminescent phosphor layer does not emit any appreciable amount of light. When an input image as indicated in FIGURE 2 is projected onto the photoemissive mosaic layer 58, local elements of the mosaic layer 58 will emit electrons which are attracted to the collector cylinder 36 by its field as it is maintained at a positive 100 volts for example. Having been exposed to a light pattern and in response thereto emitted electrons, the mosaic elements 58 will acquire a pattern of positive potentials, varying, for example, from zero to 10 volts. This pattern of potentials, by field-effect through the insualtor layer 56, will enhance the conductivity of the field effect semiconductor layer 54 in corresponding local areas. As a result of the increased conductivity of the field effect semiconductor layer 54 in local areas, alternating current will flow through the corresponding phosphor areas in layer 52 which will now emit light. Since the charge pattern stored on the photoemissive mosaic 58 will persist after the image is cut off, the output image may be viewed for a period of hours limited only by the leakage of charge from the mosaic 58.

To erase the charge pattern stored on mosaic 58, the collector cylinder 36 is switched to ground potential 42 by operation of the store-erase switch 40. As was noted above the surface of the collector cylinder 36 is coated with a suitable photoemissive material during the processing of the tube so as to be at least slightly photoemissive. By directing light from an auxiliary source (not shown) on to the collector cylinder 36, photoelectrons are generated at the collector cylinder 36. These photoelectrons will be attracted to the positive mosiac elements 58 neutralizing them until mosaic 58 reaches ground potential, thus leaving the device in an erased condition.

While the preferred embodiment has been described utilizing an alternating current source, a direct current source is also operative when used with corresponding direct current phosphors.

Although the proposed image storage device has been disclosed as operating within the evacuated envelope 34 of a vacuum tube, the device is also operable outside the vacuum of the envelope. If ultra-violet input wavelengths are used, photoemitting materials such as pure metals or magnesium oxide may be used since the quantum yield for photons of 10 electron volts is on the order of 0.1 for these materials. These materials are unaffected by air and can thus be caused to emit photoelectrons which are attracted to the collector cylinder 36. The emission of these photoelectrons causes the mosaic elements 58 to charge up as described above with regard to the similar operation in a vacuum. Since no electron-optical imaging is required of the photoelectrons in the present invention, the trajectories of the photoelectrons are immaterial to the operation of the device and the lack of a vacuum does not prevent a proper operation of the device. Further, where short-wavelength photocathodes have been utilized in the past in vacuum tubes, it has been necessary to include a special faceplate in the tube capable of transmitting these wavelengths. In the present invention, elimination of the envelope and its faceplate entirely avoids this problem.

Thus, in operation, the charging of a photoemissive mosaic in response to an optical input causes, by its field effect on the semiconductor, a change in the local conductivity of the semiconductor. As a result of the pattern of conductivity increase in the semiconductor a corresponding current flow takes place in an electroluminescent phosphor layer causing it to emit a light pattern corresponding to the input image.

Although a specific preferred embodiment of the invention has been described in the detailed description above, the description is not intended to limit the invention to the particular forms or embodiments disclosed herein since they are to be recognized as illustrative rather than restrictive. It will be obvious to those skilled in the art that the invention is not limited to the illustrative embodiments but is susceptible to numerous modifications and applications. The invention is declared to cover all the changes, modifications and applications of the specific examples of the invention herein disclosed for purposes of illustration which do not constitute departure from the spirit and scope of the invention.

What is claimed is:
1. An image converter comprising:
   (a) a transparent insulating support plate,
   (b) a set of interdigital conducting transparent electrodes on the surface of said insulating support plate,
   (c) a voltage source connected to said electrodes,
   (d) an electroluminescent phospor layer coating said electrodes and said support plate,
   (e) a field effect semiconductor layer coating said electroluminescent phosphor layer,
   (f) an insulator layer coating said field effect semiconductor layer,
   (g) a mosaic of photoemitting elements adjacent said insulator layer, and
   (h) collector means adjacent said mosaic of photoemitting elements to attract and capture emitted electrons from said mosaic whereby said mosaic will acquire a charge pattern on exposure of said mosaic to an electromagnetic input pattern and will by its field effect on said semiconductor layer alter the local conductivity of said semiconductor to allow current flow in said electroluminescent phosphor layer causing it to emit a light pattern corresponding to said input pattern.

2. The device of claim 1 wherein all of said layers form a single flat structure and said mosaic of photoemitting elements is on the outer surface of said insulator layer.

3. The device of claim 1 wherein said mosaic of photoemitting elements is separated from said insulator layer.

4. The device of claim 2 wherein said voltage source is an alternating current source.

5. The device of claim 2 wherein said voltage source is a direct current source.

6. The device of claim 4 wherein said layers, mosaic, and collector means are enclosed in an evacuated envelope.

7. The device of claim 4 wherein said collector means are photoemissive to provide for the selective erasure of said charge pattern on said mosaic.

8. The method of image conversion comprising:
   (a) exposing a mosaic of photoemitting elements to an electromagnetic input,
   (b) collecting the photoemitted electrons from said mosaic whereby a charge pattern is formed on said mosaic,
   (c) insulating said mosaic from direct electrical contact with an underlying field effect semiconductor layer, and
   (d) applying a potential to interdigital transparent conducting electrodes within an electroluminescent phosphor coating said semiconductor whereby said electroluminescent phosphor emits a light pattern in response to current flow in said phosphor which is controlled by the filed effect on said semiconductor of said charge pattern stored on said mosaic.

References Cited

UNITED STATES PATENTS

| | | | |
|---|---|---|---|
| 2,645,721 | 7/1953 | Williams | 250—71 |
| 3,100,845 | 8/1963 | Sllar | 250—213 |
| 3,073,989 | 1/1963 | Amsterdam | 313—65 X |
| 3,322,999 | 5/1967 | Kazan | 315—12 |
| 3,339,075 | 8/1967 | Szepesi | 250—213 |

WALTER STOLWEIN, *Primary Examiner.*

U.S. Cl. X.R.

313—65; 315—12